United States Patent
Sadowara

(10) Patent No.: US 10,999,458 B2
(45) Date of Patent: *May 4, 2021

(54) IMAGE FORMING APPARATUS AND IMAGE FORMING METHOD

(71) Applicant: TOSHIBA TEC KABUSHIKI KAISHA, Tokyo (JP)

(72) Inventor: Tetsuya Sadowara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,528

(22) Filed: Mar. 12, 2020

(65) Prior Publication Data

US 2020/0213462 A1 Jul. 2, 2020

Related U.S. Application Data

(63) Continuation of application No. 16/198,093, filed on Nov. 21, 2018, now Pat. No. 10,602,008.

(51) Int. Cl.
*G06K 15/00* (2006.01)
*H04N 1/00* (2006.01)

(52) U.S. Cl.
CPC ....... *H04N 1/00644* (2013.01); *H04N 1/0057* (2013.01); *H04N 1/00482* (2013.01); *H04N 1/00649* (2013.01); *H04N 1/00689* (2013.01); *H04N 1/00726* (2013.01); *H04N 2201/0094* (2013.01)

(58) Field of Classification Search
CPC .......... H04N 1/00644; H04N 1/00482; H04N 1/0057; H04N 1/00649; H04N 1/00689; H04N 2201/0094
See application file for complete search history.

(56) References Cited

U.S. PATENT DOCUMENTS 5,367,362 A * 11/1994 Forest ............... G03G 15/60
377/8
5,729,623 A   3/1998 Omatu et al.
(Continued)

FOREIGN PATENT DOCUMENTS

JP   2005-136733 A2   5/2005

OTHER PUBLICATIONS

Non-Final Office Action on U.S. Appl. No. 16/198,093 dated Jun. 27, 2019.
(Continued)

*Primary Examiner* — Moustapha Diaby
(74) *Attorney, Agent, or Firm* — Foley & Lardner LLP

(57) ABSTRACT

According to one embodiment, an image forming apparatus includes, a sheet transporting unit, a scanner, a print unit, an input device, a counter, and a control unit. The sheet transporting unit transports a predetermined number of sheets among a plurality of the sheets. The scanner reads the sheets which are transported by the sheet transporting unit as image data. The print unit prints the image data which is read by the scanner. The input device receives an input from a user. The counter counts the number of the transported sheets. The control unit controls the sheet transporting unit and the print unit depending on the number of the transported sheets and the number of sheets which are input by the user.

19 Claims, 7 Drawing Sheets

(56) References Cited

U.S. PATENT DOCUMENTS

| | | | |
|---|---|---|---|
| 8,643,919 B2 | 2/2014 | Saida | |
| 2002/0186424 A1* | 12/2002 | Sturgeon | H04N 1/00063 358/474 |
| 2010/0231963 A1 | 9/2010 | Oda et al. | |
| 2010/0328739 A1* | 12/2010 | Saida | H04N 1/00448 358/498 |
| 2013/0030890 A1* | 1/2013 | Richardson | G06Q 30/00 705/14.14 |

OTHER PUBLICATIONS

Notice of Allowance on U.S. Appl. No. 16/198,093 dated Nov. 14, 2019.

* cited by examiner

FIG. 3

PLEASE INPUT NUMBER OF SHEETS OF PAPER YOU WANT TO COUNT

25 SHEETS

NUMBER OF COUNTED SHEETS  0  SHEETS

KP
| 7 | 8 | 9 |
| 4 | 5 | 6 |
| 1 | 2 | 3 |
| 0 | C |

CANCEL  START

FIG. 4

```
                                                         ~120
PLEASE INPUT NUMBER OF SHEETS OF PAPER YOU WANT TO COUNT

┌─────────────┐
        │      25     │
        └─────────────┘   SHEETS

NUMBER OF COUNTED SHEETS   25   SHEETS

┌──────────────────────────────────┬───────┐
        │        COUNT IS COMPLETED        │  END  │
        └──────────────────────────────────┴───────┘
```

*FIG. 5*

```
                                                                    120
┌─────────────────────────────────────────────────────────────────────┐
│ PLEASE INPUT NUMBER OF SHEETS OF PAPER YOU WANT TO COUNT            │
│                                                                     │
│   ┌───────────────┐                                                 │
│   │      25       │                                                 │
│   │               │    SHEETS                                       │
│   └───────────────┘                                                 │
│                                                                     │
│                                                                     │
│   NUMBER OF COUNTED SHEETS   15   SHEETS                            │
│   ┌──────────────────────────────────┬─────────┬─────────┐          │
│   │  PAPER IS INSUFFICIENT           │  PRINT  │   END   │          │
│   └──────────────────────────────────┴─────────┴─────────┘          │
└─────────────────────────────────────────────────────────────────────┘
```

FIG. 7

```
PLEASE INPUT NUMBER OF SHEETS OF PAPER YOU WANT TO COUNT

TOTAL SHEETS YOU WANT TO COUNT : 102 SHEETS    NUMBER OF COUNTED SHEETS

COUNT A        [ 35 ]  SHEETS        0  SHEETS      | 7 | 8 | 9 |
                                                    | 4 | 5 | 6 |
COUNT B        [ 31 ]  SHEETS        0  SHEETS      | 1 | 2 | 3 |
                                                    | 0 | C |
COUNT C        [ 36 ]  SHEETS        0  SHEETS

[ ADD COUNT ]              [ CANCEL ]            [ START ]
```
—120

IMAGE FORMING APPARATUS AND IMAGE FORMING METHOD

CROSS-REFERENCE TO RELATED APPLICATIONS

This application is a continuation of co-pending U.S. application Ser. No. 16/198,093 filed Nov. 21, 2018, the entire contents of which are incorporated herein by reference.

FIELD

Embodiments described herein relate generally to an image forming apparatus and an image forming method.

BACKGROUND

A multifunction peripheral (MFP) has a document feeder that transports the document one by one to a scanner. Some MFPs also have a counter that counts the total number of documents transported by the feeder.

When there is a bundle of printed sheets whose total number is unknown, the MFP can count the number of the printed sheets in the bundle and can show the counted number to the user. However, when the user wants to prepare a predetermined number of printed sheets using this bundle of sheets, another action of the user may be necessary due to shortage. For example, suppose the user wants to prepare 100 printed sheets and the counter shows 80 as the counted number, 20 sheets are short from the target number. Therefore, the user would need to make additional 20 copies or prints. To make the additional prints, the user would have to operate the MFP or PCs again. A more efficient method is desired to prepare a predetermined number of printed sheets.

DESCRIPTION OF THE DRAWINGS

FIG. 3 is a diagram illustrating a display example of sheet number count according to the embodiment.

FIG. 4 is a diagram illustrating a display example when the sheet number count according to the embodiment is completed.

FIG. 5 is a diagram illustrating a display example when the sheet number count according to the embodiment fails.

FIG. 7 is a diagram illustrating a display example of the sheet number count according to the embodiment.

DETAILED DESCRIPTION

An object to be achieved by an exemplary embodiment is to provide an image forming apparatus and an image forming method which can easily align a certain number of sheets from a plurality of sheets.

In general, according to one embodiment, an image forming apparatus includes a sheet transporting unit, a scanner, a print unit, an input device, a counter, and a control unit. The sheet transporting unit transports a predetermined number of sheets among a plurality of the sheets. The scanner reads the sheets which are transported by the sheet transporting unit as image data. The print unit prints the image data which is read by the scanner. The input device receives an input from a user. The counter counts the number of the transported sheets. The control unit controls the sheet transporting unit and the print unit depending on the number of the transported sheets and the number of sheets which are input by the user.

Hereinafter, the image forming apparatus and an image forming method according to embodiments will be described with reference to the drawings.

Figure 1:
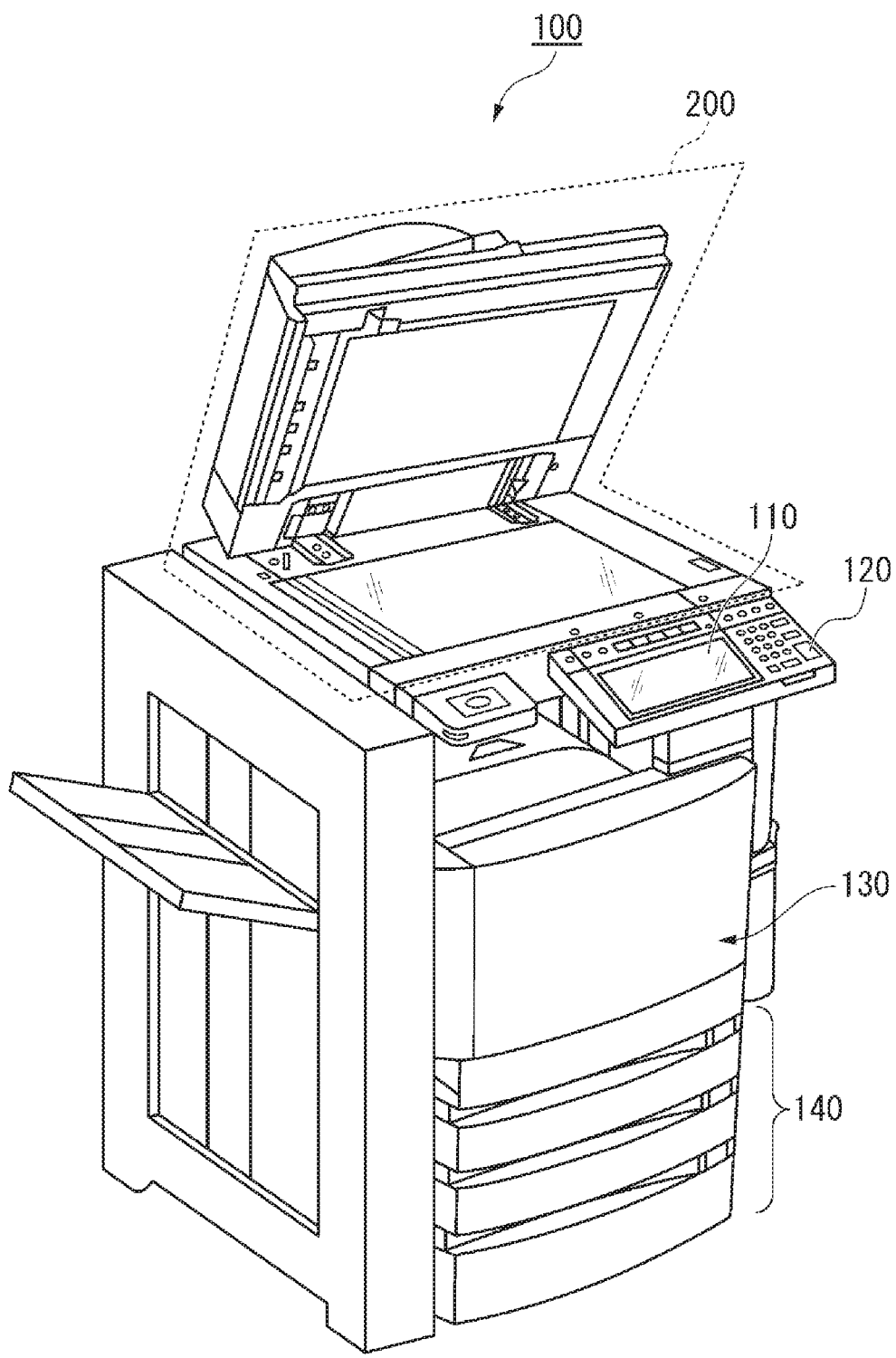
FIG. 1 is an external view illustrating the entire configuration example of an image forming apparatus according to an embodiment.

FIG. 1 is an external view illustrating the entire configuration example of an image forming apparatus 100 according to an embodiment. The image forming apparatus 100 is, for example, a multifunction peripheral. The image forming apparatus 100 includes a display 110, a control panel 120, a printer 130, a sheet containing unit 140, and an image reading unit 200. The printer 130 of the image forming apparatus 100 may be an apparatus that fixes a toner image or may be an apparatus of an ink jet type.

The image forming apparatus 100 forms an image on a sheet using a developer such as toner. The sheet is, for example, paper or label paper. The sheet may be anything as long as the image forming apparatus 100 can form an image on a surface thereof.

The display 110 is an image display device such as a liquid crystal display or an organic electro luminescence (EL) display. The display 110 displays various types of information relating to the image forming apparatus 100.

The control panel 120 includes a plurality of buttons. The control panel 120 receives an input corresponding to an operation performed by a user. The control panel 120 outputs a signal corresponding to the operation performed by the user to a control unit of the image forming apparatus 100. The display 110 and the control panel 120 may be configured as an integral touch panel.

The printer 130 forms an image on a sheet, based on image information generated by the image reading unit 200 or image information received via a communication path. The printer 130 forms an image through, for example, the following processing. An image forming unit of the printer 130 forms an electrostatic latent image on a photoconductive drum, based on the image information. The image forming unit or the printer 130 forms a visible image by attaching the developer to the electrostatic latent image. A specific example of the developer is toner. A transfer unit of the printer 130 transfers the visible image onto the sheet. A fixing unit of the printer 130 fixes the visible image on the sheet by heating and pressurizing the sheet. The sheet on which an image is formed may be a sheet contained in the sheet containing unit 140 or may be a sheet held by hand. The printer 130 is an aspect of a print unit.

The sheet containing unit 140 contains a sheet used for image formation in the printer 130.

The image reading unit 200 reads image information of a read target as light and shade of light. The image reading unit 200 records the read image information. The recorded image information may be transmitted to another information processing apparatus via a network. An image may be formed on a sheet by the printer 130, according to the recorded image information. The image reading unit 200 may include an original document table.

Figure 2:
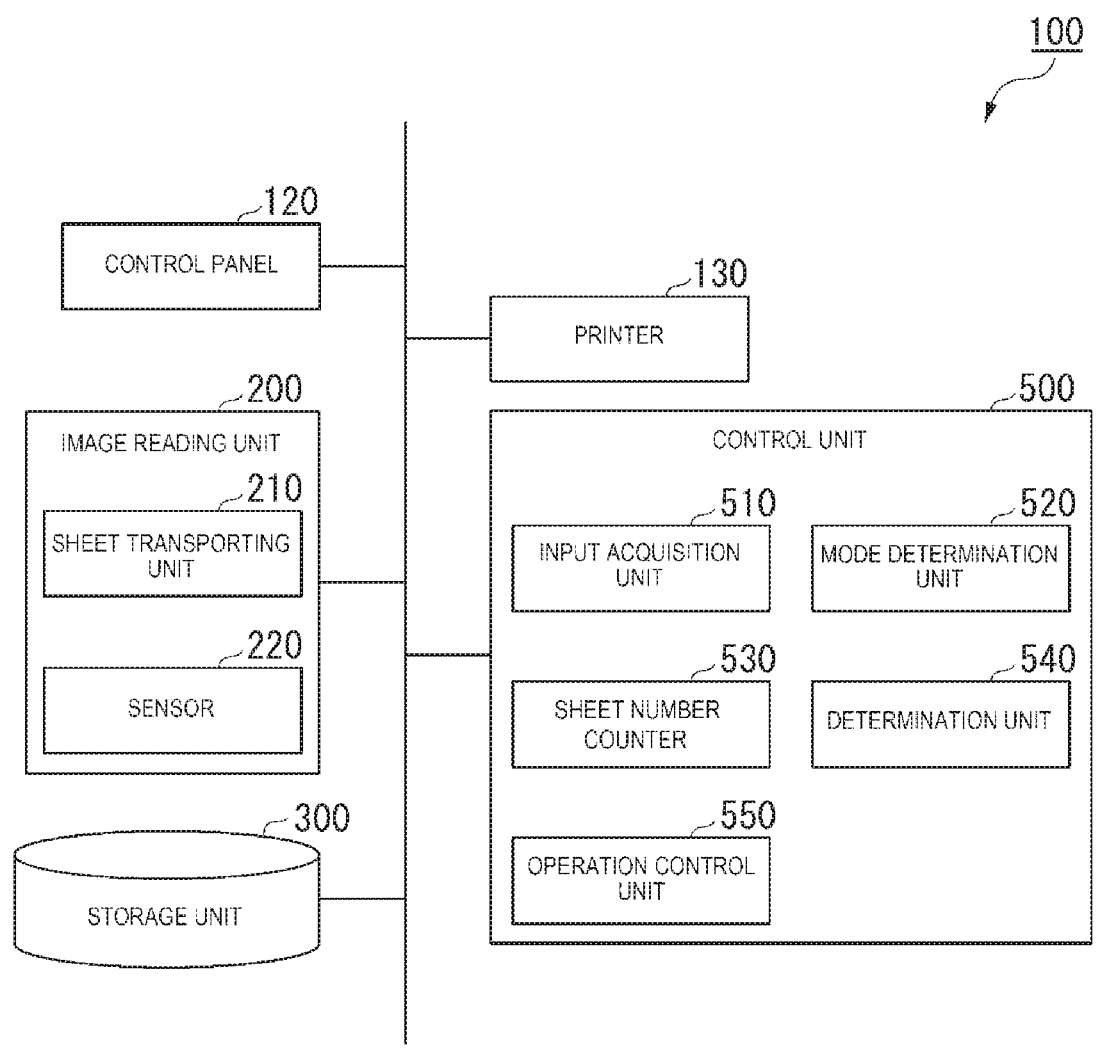
FIG. 2 is a block diagram illustrating functions of the image forming apparatus according to the embodiment.

FIG. 2 is a block diagram illustrating functions of the image forming apparatus 100 according to the embodiment. The image forming apparatus 100 includes a control panel 120, a printer 130, an image reading unit 200, a storage unit 300, and a control unit 500. The description on the control panel 120 and the printer 130 which are previously described with reference to FIG. 1 will be omitted.

The image reading unit 200 includes a sheet transporting unit 210 and a sensor 220. In the present embodiment, the image reading unit 200 is a predetermined place for placing an original document and will be described below as unit including an original document table.

The sheet transporting unit 210 automatically transports an original document placed on the original document table. At this time, for example, the sheet transporting unit 210 scans a first sheet (first copy) when transporting the original document. The sheet transporting unit 210 stores the scanned image data in the storage unit 300.

The sensor 220 is a weight sensor included in the original document table and is a sensor such as an optical sensor included in the sheet transporting unit 210. For example, the sheet transporting unit 210 determines whether or not an original document is placed on the sheet transporting unit 210 by using the weight sensor of the original document table and sends a determination result to a determination unit 540. For example, the optical sensor sends data on the number of original documents transported by the sheet transporting unit 210 to a sheet number counter 530.

The storage unit 300 is configured by using a storage device such as a magnetic hard disk device or a semiconductor memory device. The storage unit 300 stores a program for operating the image reading unit 200 that represents mode setting (hereinafter referred to as an "operation mode") of an operation of the sheet transporting unit 210. For example, in the present embodiment, three types of processing of print processing, scan processing, and count processing are set as the operation mode performed by the image reading unit 200. For example, the storage unit 300 stores a program of operating the print processing, the scan processing, and the count processing. The storage unit 300 stores the image data scanned by the sheet transporting unit 210 and the image reading unit 200.

The control unit 500 is configured by using a processor such as a central processing unit (CPU). As the processor executes a program, the control unit 500 functions as an input acquisition unit 510, a mode determination unit 520, the sheet number counter 530, the determination unit 540, and an operation control unit 550.

The input acquisition unit 510 acquires a signal according to an operation performed by a user notified from the control panel 120. The input acquisition unit 510 sends the acquired signal to the mode determination unit 520 and the determination unit 540. For example, the input acquisition unit 510 receives the number of sheets the user wants to count (hereinafter, referred to as "the number of counted sheets").

The mode determination unit 520 determines whether or not the operation mode received from a user is count processing. If the operation mode is not the count processing, the mode determination unit 520 causes the image reading unit 200 to perform the operation mode received from the user. For example, the mode determination unit 520 reads a program of the received operation mode from the storage unit 300 and causes the image reading unit 200 to execute the program. If the operation mode is the count processing, the mode determination unit 520 causes the image reading unit 200 to perform the count processing.

The sheet number counter 530 counts the number of sheets (hereinafter, referred to as "the number of transported sheets") or original documents transported by the sheet transporting unit 210, based on a value received from the optical sensor of the sensor 220. The sheet number counter 530 increments the count of the number of transported sheets each time the original document is transported.

The sheet number counter 530 resets the sheet number counter 530 if the original documents of the number corresponding to the counted sheet number are transported among the original documents placed in the automatic document feeder (ADF). The sheet number counter 530 sends the number of sheets transported by the sheet transporting unit 210 to the determination unit 540.

The determination unit 540 determines whether or not the number of transported sheets is less than the number of counted sheets, based on the number of transported sheets and the number of counted sheets. The determination unit 540 sends the determination result to the operation control unit 550.

The operation control unit 550 controls the sheet transporting unit 210, based on the determination result of the determination unit 540. For example, if the number of transported sheets is less than the number of counted sheets, the operation control unit 550 causes the sheet transporting unit 210 to transport the original documents. For example, if the number of transported sheets and the number of counted sheets are equal to each other, the operation control unit 550 causes the sheet transporting unit 210 to stop transporting the original document.

The operation control unit 550 controls the sheet transporting unit 210 and the printer 130, based on the determination result of the sheet transporting unit 210 and the determination result of the determination unit 540. For example, if an original document is placed in the ADF and if the number of transported sheets is less than the counted sheet number, the operation control unit 550 causes the sheet transporting unit 210 to transport the original document. For example, if the original document is placed in the ADF and if the number of transported sheets is less than the number of counted sheets, the operation control unit 550 causes the sheet transporting unit 210 to stop transporting the original document.

For example, if the original document is not placed in the ADF and if the number of transported sheets and the number of counted sheets are equal to each other, the operation control unit 550 causes the sheet transporting unit 210 to stop transporting the original document. For example, if the original document is not placed in the ADF and if the number of transported sheets is less than the number of counted sheets, the operation control unit 550 causes the printer 130 to print a difference between the number of counted sheets and the number of transported sheets.

FIG. 3 is a diagram illustrating a display example of a sheet number count according to the embodiment.

In FIG. 3, a keypad KP, the number of counted sheets input by a user, the number of transported sheets counted by the sheet number counter 530, a cancel button, and a start button are displayed on the control panel 120 as an example. As the user presses the keypad KP, the control panel 120 notifies the input acquisition unit 510 of a predetermined counted sheet number.

For example, if the user presses the keypad KP in the order of "2" and "5", the control panel 120 notifies the input acquisition unit 510 that the number of counted sheets is 25. If the user presses the "cancel" button, the control panel 120 notifies the input acquisition unit 510 of an instruction to end the processing. If the user presses the "start" button, the control panel 120 notifies the input acquisition unit 510 of an instruction to start processing.

FIG. 4 is a diagram illustrating a display example when the sheet number count according to embodiment is completed. In FIG. 4, for example, when the number of transported sheets counted by the sheet number counter 530 is 25, the determination unit 540 sends a stop instruction to the sheet transporting unit 210. Then, the control panel 120 displays the display example of FIG. 4, and if the user presses the "end" button, the control panel 120 ends the processing.

FIG. 5 is a diagram illustrating a display example when a sheet number count according to the embodiment fails. In FIG. 5, when the number of transported sheets is 15, the determination unit 540 determines that the original document is not placed. Accordingly, the determination unit 540 calculates a difference between the number of transported sheets and the number of counted sheets as ten sheets. The control panel 120 displays the display example of FIG. 5 and waits for input from the user. If the user presses a "print" button, the control panel 120 notifies the input acquisition unit 510 of a printing instruction. The determination unit 540 sends the calculated difference to the operation control unit 550. The operation control unit 550 sends a printing instruction to the printer 130, based on the difference (10 sheets) received from the determination unit 540. If the user presses the "end" button, the control panel 120 ends the processing.

Figure 6:
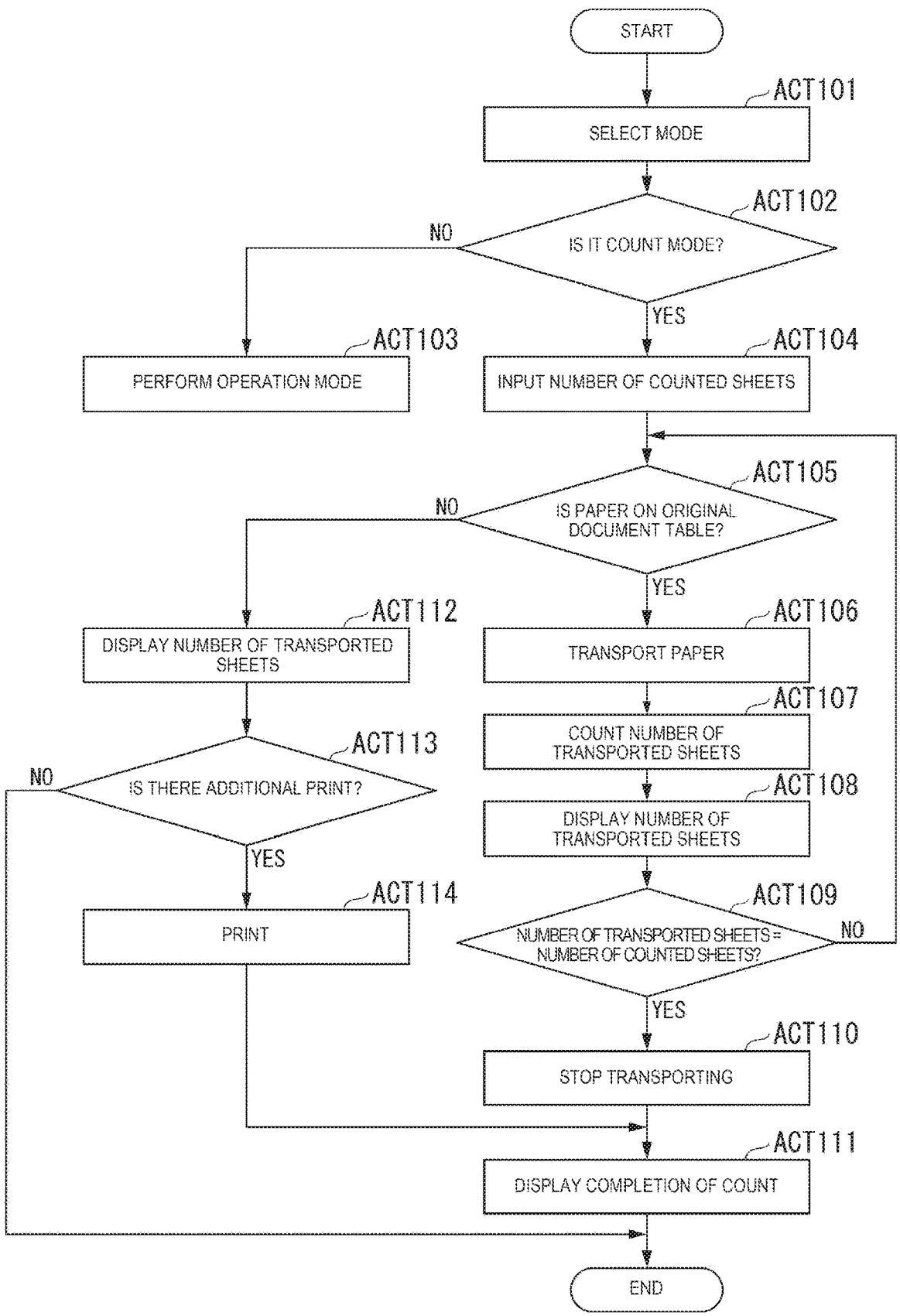
FIG. 6 is a flowchart illustrating a print flow of the image forming apparatus according to the embodiment.

FIG. 6 is a flowchart illustrating a print flow of the image forming apparatus 100 according to an embodiment.

The input acquisition unit 510 receives an operation mode from a user (ACT 101). The mode determination unit 520 determines whether or not the operation mode received from the user is count processing (ACT 102).

If the operation mode is not the count processing (ACT 102—NO), the image forming apparatus 100 performs the selected operation mode (ACT 103). If the operation mode is the count processing (ACT 102—YES), the control panel 120 receives the number of counted sheets from the user (ACT 104). The control panel 120 notifies the input acquisition unit 510 of the number of counted sheets which are received. The ADF determines whether or not the original document is placed on the ADF, based on the data received from the sensor 220 (ACT 105).

If the original document is placed on the ADF (ACT 105—YES), the sheet transporting unit 210 transports the original document (ACT 106). In the processing of the ACT 106, the ADF scans the first original document or the first copy. The sheet number counter 530 counts the number of transported sheets (ACT 107). The control panel 120 displays the number of transported sheets (ACT 108).

The determination unit 540 determines whether or not the number of transported sheets and the number of counted sheets are equal to each other (ACT 109). If the number of transported sheets is equal to the number of counted sheets (ACT 109—NO), the processing returns to ACT 104. If the number of transported sheets is equal to the number of counted sheets (ACT 109—YES), the operation control unit 550 causes the sheet transporting unit 210 to stop transporting the original document (ACT 110). As the processing result, the control panel 120 displays, for example, the results of the number of counted sheets and the number of transported sheets (ACT 111).

If the original document is not placed on the ADF (ACT 105—NO), the number of transported sheets does not increase any more, and thus, it is confirmed that the number of transported sheets does not reach the number of counted sheets. In this case, the display of the number of transported sheets on the control panel 120 remains as displayed in the ACT 107 just before. The operation control unit 550 calculates a difference between the number of transported sheets and the number of counted sheets (ACT 112). The operation control unit 550 causes the control panel 120 to display a screen asking the user whether or not to perform an additional print for the number of sheets of the calculated difference. In response to the operation onto the screen, the control panel 120 receives an instruction as to whether or not to perform the additional print from the user (ACT 113). If the instruction to perform the additional print is not received (ACT 113—NO), the operation control unit 550 ends the processing.

If the instruction to perform the additional print is received (ACT 113—YES), the operation control unit 550 causes the printer 130 to print the number of sheets of the difference (ACT 114).

According to the image forming apparatus 100 of the embodiment configured as described above, the operation control unit 550 that controls the sheet transporting unit 210 and the printer 130 is included, and thereby, even if the number of transported sheets is less than the number of counted sheets, it is possible to equalize the number of counted sheets to the total number of the number of transported sheets and the number of printed sheets by printing the numbers using the printer 130. Thereby, it is possible to provide an image forming apparatus and an image forming method which can easily align a certain number or sheets from a plurality of sheets.

Modification Example

The input acquisition unit 510 may receive an instruction from a user via the control panel 120 or may receive the instruction from an external device via a network or the like.

An original document may be a sheet on which an image is formed or a sheet on which an image is not formed.

If the original document is not placed and if the number of transported sheets is less than the number of counted sheets, the operation control unit 550 may display a difference between the number of counted sheets and the number of transported sheets on the control panel 120. Then, if there is no instruction to perform an additional print from the user, the operation control unit 550 may end the processing.

The sheet transporting unit 210 does not scan the first sheet (first copy). If the original document is insufficient, the sheet transporting unit 210 may notify the control panel 120 as to whether or not to perform the scan, as output information. The control panel 120 presents the received output information to the user. For example, if the user selects to perform the scan, the sheet transporting unit 210 may notify the control panel 120 of a notification for placing the original document to be scanned as the output information. In addition, for example, if the user selects not to perform the scan, the printer 130 may read and print the same image data as the original document transported from the storage unit 300. In addition, for example, if the user selects not to perform the scan, the printer 130 may acquire and print the same image data as the original document transported via the network.

FIG. 7 is a diagram illustrating a display example of the sheet number count according to the embodiment. The input acquisition unit 510 may receive a plurality of instructions from a user as illustrated in FIG. 7. As illustrated in FIG. 7. For example, the control panel 120 displays the display example of FIG. 7 and waits for an input from the user. FIG. 7 illustrates a state where the number of counted sheets A is 35, the number of counted sheets B is 31, and the number of counted sheets C is 36, which are input from the user, as an example. If the user presses a "count addition" button, the control panel 120 receives an input of the number of counted sheets from the user as the number of counted sheets D. Description on the items described with reference to FIG. 3 to FIG. 5 will be omitted.

The storage unit 300 may store the number of transported sheets which are received.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would within the scope and spirit of the invention.

What is claimed is:

1. An image forming apparatus comprising:
   a sheet transporter configured to transport a plurality of sheets;
   a counter configured to count a number of the plurality of sheets transported by the sheet transporter and save the number as a counted number;
   a scanner configured to read the plurality of transported sheets as image data;
   a printer configured to print the image data read by the scanner;
   an input panel configured to receive from a user an input of a target number; and
   a controller configured to control the printer to print at least a portion of the image data read by the scanner based on a comparison between the target number and the counted number,
   wherein the controller, upon a determination that the target number being greater than the counted number, is further configured to, print a difference number of the image data read by the scanner on additional sheets, the difference number being a difference between the target number and the counted number.

2. The image forming apparatus according to claim 1, wherein the input panel receives a plurality of numbers, and the target number is determined based on a sum of the plurality of numbers received by the input panel.

3. The image forming apparatus according to claim 2, wherein the controller, upon a determination that the target number is equal to the counted number, controls the sheet transporter to stop to transport the plurality of sheets.

4. The image forming apparatus according to claim 1, further comprising a display panel to display the counted number and an operation status of the printer.

5. The image forming apparatus according to claim 4, wherein the input panel and the display panel are configured as an integral touch panel.

6. The image forming apparatus according to claim 1, wherein the controller includes:
   an input acquisition unit configured to receive an operation mode selected by the user, and
   a mode determination unit configured to determine whether the target number from the user is required in the selected operation mode.

7. A method for printing a number of sheets, the method comprising:
   receiving a target number of sheets from a user;
   sensing whether a document is present in an original document table;
   upon determining that a document is present at the original document table, counting a number of sheets of the document;
   comparing the number of sheets of the document to the target number of sheets; and
   printing, upon determining that the document present at the original document table has been transported away, an additional number of sheets when the target number of sheets is greater than the number of sheets of the document.

8. The method according to claim 7, wherein counting the number of sheets of the document comprises:
   transporting the document from the original document table through a scanner, and
   scanning the document to acquire and save image data thereof.

9. The method according to claim 8, wherein printing the additional number of sheets comprises printing a difference between the target number of sheets and the number of sheets of the document using the image data scanned from the document.

10. The method according to claim 7, wherein receiving the target number of sheets from the user comprises:
    providing the user an option to select a count mode; and
    upon receiving a selection of the count mode, prompting the user to enter the target number using an input panel.

11. The method according to claim 10, further comprising displaying, using a display panel, the number of sheets of the document counted and an operation status.

12. The method according to claim 7, wherein counting the number of sheets of the document comprises:
    transporting the document from the original document table, and
    stopping the transportation of the document when the target number of sheets is equal to the number of sheets of the document.

13. The method according to claim 12, further comprising displaying a completion of operation including a number of counted sheets and a number of transported sheets, the number of counted sheets being the target number of sheets and the number of transported sheets being a number of sheets of the document transported from the original document table.

14. A system for providing a predetermined number of printed sheets, the system comprising:
    a scanner having a document feeder;
    a counter configured to count a number of pages of an original document going through the document feeder;
    an interface configured to receive a target number of sheets from a user;
    a printer; and
    a controller configured to:
      monitor the counted number of pages determined by the counter;
      determine a difference between the counted number of pages and the target number of sheets; and
      upon determining that the target number of sheets is greater than the counted number of pages, send instructions to the printer to print additional number of sheets to supplement the difference between the target number of sheets and the counted number of pages.

15. The system according to claim 14, wherein the controller is further configured to stop the document feeder, upon determining that the target number of sheets is equal to the counted number of pages, from transporting to the scanner.

16. The system according to claim 14, further comprising a display panel to display the counted number of pages of the original document going through the document feeder and to display an operation status of the printer.

17. The system according to claim 14, wherein the interface includes an integral touch panel having an input panel and a display panel.

18. The system according to claim 14, wherein the controller includes:
- an input acquisition unit configured to receive an operation mode selected by the user, and
- a mode determination unit configured to determine whether the target number from the user is required in the selected operation mode.

19. The system according to claim 14, wherein the controller is further configured to:
- determine whether the document feeder has been emptied; and
- upon a determination that the document feeder has been emptied, send instructions to the printer to print the additional number of sheets to supplement the difference between the target number of sheets and the counted number of pages.

\* \* \* \* \*